United States Patent
Said et al.

(10) Patent No.: US 9,441,863 B2
(45) Date of Patent: Sep. 13, 2016

(54) INTERMITTENT ABSORPTION REFRIGERATION SYSTEM WITH AN EJECTOR

(71) Applicant: KING FAHD UNIVERSITY OF PETROLEUM AND MINERALS, Dhahran (SA)

(72) Inventors: Syed A. M. Said, Dhahran (SA); Muhammad Umar Siddiqui, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 329 days.

(21) Appl. No.: 14/259,100

(22) Filed: Apr. 22, 2014

(65) Prior Publication Data

US 2015/0300703 A1   Oct. 22, 2015

(51) Int. Cl.
*F25B 17/00* (2006.01)
*F25B 17/02* (2006.01)
*F25B 27/00* (2006.01)
*F25B 41/00* (2006.01)

(52) U.S. Cl.
CPC ............. *F25B 17/02* (2013.01); *F25B 27/007* (2013.01); *F25B 41/00* (2013.01); *Y02B 30/62* (2013.01)

(58) Field of Classification Search
CPC ..... Y02B 30/62; Y02B 30/625; F25B 17/02; F25B 27/007; F25B 41/00; F25B 27/00
USPC ........................................................ 62/235.1
See application file for complete search history.

(56) References Cited

U.S. PATENT DOCUMENTS

| | | | |
|---|---|---|---|
| 2,313,250 A | 3/1943 | Lynger | |
| 4,007,776 A | 2/1977 | Alkasab | |
| 4,023,375 A * | 5/1977 | Chinnappa | F24F 5/0046 62/148 |
| 4,966,014 A | 10/1990 | Erickson | |

* cited by examiner

*Primary Examiner* — Marc Norman
*Assistant Examiner* — Ana Vazquez
(74) *Attorney, Agent, or Firm* — Richard C. Litman

(57) ABSTRACT

The intermittent absorption refrigeration system with an ejector includes a generator/absorber unit, a solar collector unit, a dephlegmator, a condenser unit, a first evaporator, and valves to control the flow of aqua-ammonia coolant through the system, as in a conventional intermittent absorption refrigeration system. However, the present system also includes an ejector disposed between the dephlegmator and the condenser, and also a second evaporator disposed in a feedback loop between the first evaporator and the ejector, together with appropriate valves to control coolant flow through the feedback loop. The utilization of the ejector and the feedback loop in the intermittent system allows the intermittent system to produce a cooling effect during the daytime, as well as during the nighttime, which increases the coefficient of performance of the intermittent system.

5 Claims, 1 Drawing Sheet

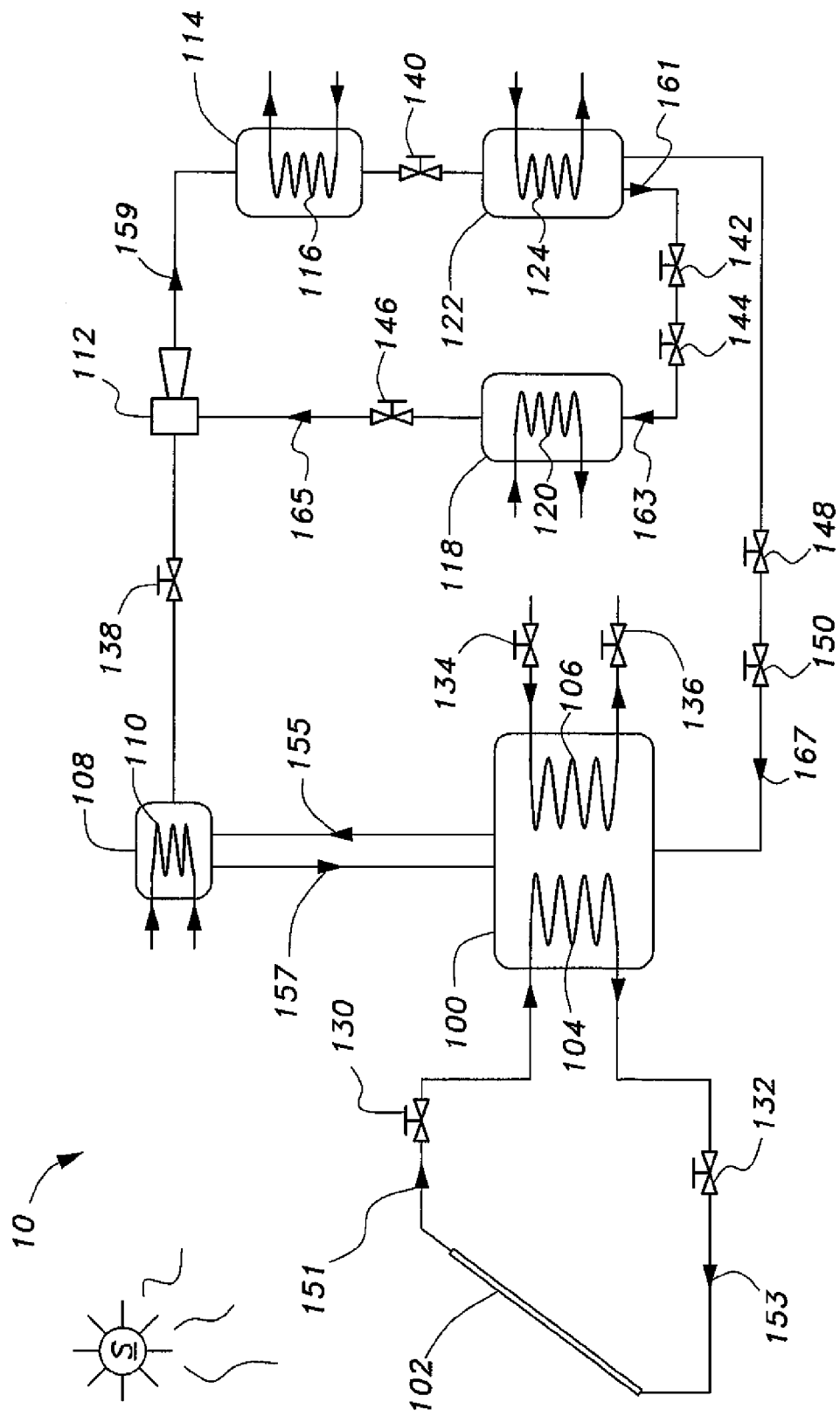

INTERMITTENT ABSORPTION REFRIGERATION SYSTEM WITH AN EJECTOR

BACKGROUND OF THE INVENTION

1. Field of the Invention

The present invention relates to intermittent absorption refrigeration systems, and particularly to an intermittent absorption refrigeration system with an ejector that permits both daytime and nighttime cooling applications, thereby increasing the coefficient of performance in the intermittent system.

2. Description of the Related Art

Conservation of energy, namely electricity, in both the production and consumption sectors, is continuing to be a worldwide priority. One such area is in the development of air-conditioning and refrigeration systems. It is no surprise that the days, times, and locations requiring maximum cooling loads coincide with the days and times with the highest temperatures and locations with the hottest climates. Conventional air-conditioning and refrigeration systems are powered using electricity. In the areas with the hottest climates and during the days and times with the hottest temperatures, the use of electricity to power such air-conditioning and refrigeration systems becomes very expensive and inefficient.

Solar power can be utilized to provide power for refrigeration and air-conditioning systems. Absorption chillers, for example, can use solar energy to produce refrigeration. They can be classified in two different categories, namely, continuous operation systems and intermittent operation systems. The difference between the two systems lies in their mode of operation. For example, in continuous systems both generation and absorption of energy take place at the same time in a continuous manner, whereas in intermittent systems, the generation and absorption of energy do not take place at the same time. Instead the generation and absorption of energy follow each other intermittently within the operation of the system.

Compared to continuous systems, intermittent systems have the advantage of not requiring any solution pump for their operation. Although not requiring a solution pump, their coefficient of performance is still comparatively very low. Additionally, conventional intermittent absorption systems can only produce the requisite cooling capacity for low temperature freezing applications at nighttime, since they cannot efficiently achieve the required high generation temperatures, low condenser temperatures, and low absorption temperatures needed to produce the cooling capacity required for low temperature freezing applications during the daytime.

Moreover, in conventional intermittent absorptions systems, high generation temperatures require the use of expensive concentrators, in addition to solar collectors, which considerably increases the overall capital cost of such systems. This significant increase in capital cost, therefore, makes conventional intermittent absorptions systems cost prohibitive and not economically feasible.

Thus, an intermittent absorption refrigeration system with an ejector solving the aforementioned problems is desired.

SUMMARY OF THE INVENTION

The intermittent absorption refrigeration system with an ejector includes a generator/absorber unit, a solar collector unit, a dephlegmator, a condenser unit, a first evaporator, and valves to control the flow of aqua-ammonia coolant through the system, as in a conventional intermittent absorption refrigeration system. However, the present system also includes an ejector disposed between the dephlegmator and the condenser, and also a second evaporator disposed in a feedback loop between the first evaporator and the ejector, together with appropriate valves to control coolant flow through the feedback loop. The utilization of the ejector and the feedback loop in the intermittent system allows the intermittent system to produce a cooling effect during the daytime, as well as during the nighttime, which increases the coefficient of performance of the intermittent system.

These and other features of the present invention will become readily apparent upon further review of the following specification and drawings.

BRIEF DESCRIPTION OF THE DRAWINGS

The sole drawing is a schematic diagram of an intermittent absorption refrigeration system with an ejector according to the present invention.

DETAILED DESCRIPTION OF THE PREFERRED EMBODIMENTS

The intermittent absorption refrigeration system with an ejector includes a generator/absorber unit, a solar collector unit, a dephlegmator, a condenser unit, a first evaporator, and valves to control the flow of aqua-ammonia coolant through the system, as in a conventional intermittent absorption refrigeration system. However, the present system also includes an ejector disposed between the dephlegmator and the condenser, and also a second evaporator disposed in a feedback loop between the first evaporator and the ejector, together with appropriate valves to control coolant flow through the feedback loop. The utilization of the ejector and the feedback loop in the intermittent system allows the intermittent system to produce a cooling effect during the daytime, as well as during the nighttime, which increases the coefficient of performance of the intermittent system.

Referring to the sole drawing, the intermittent absorption refrigeration system with an ejector, the system being referred to generally as 10 in the drawing, includes a generator/absorber unit 100, a dephlegmator unit 108, an ejector 112, a condenser unit 114, a first evaporator unit 122, a second evaporator unit 118, and a solar collector unit 102, which generates power from the sun S that is converted into heat that can be transferred to the generator/absorber unit 100.

The generator/absorber unit 100 houses a generator heat exchanger 104 for heating purposes when the generator/absorber unit 100 is behaving as a generator during the daytime. The generator/absorber unit 100 also houses an absorber heat exchanger 104 for cooling purposes so that the first generator/absorber unit 100 can behave as an absorber, e.g., during the nighttime.

The solar collector 102 is in communication with and selectively connected to the heat exchange coil 104 in the generator/absorber unit 100 by conduits controlled by valves 130 and 132. The generator/absorber unit 100 is connected with the dephlegmator unit 108. The dephlegmator unit 108 is located above the generator/absorber unit 100. The dephlegmator unit 108 houses a heat exchanger 110 for cooling purposes, and is selectively connected to the ejector 112 by conduit controlled by a ball valve 138. The ejector 112 is composed of a nozzle, a mixing chamber and a diffuser section.

The ejector 112 is connected to the condenser unit 114. The condenser unit 114 houses a condenser 116 and is selectively connected with the first evaporator unit 122 through conduit regulated by a valve 140. The first evaporator unit houses a heat exchanger 124. A second evaporator unit 118 is selectively connected to the first evaporator unit 122 by conduit as regulated by valves 142 and 144. The second evaporator unit 118 houses a heat exchanger 120. The second evaporator unit 118 is also connected to the ejector 112 through conduit controlled by a valve 146. It is should be understood that the valves used in the present system 10 are not limited to ball valves and throttling valves, but can also include such valves as check valves, gate valves, globe valves, and butterfly valves, for example.

Due to the intermittent nature of the system 10, the generator/absorber unit 100 behaves as a generator during the daytime and behaves as an absorber during the nighttime. The process usually begins with partial pressurization of an aqua-ammonia solution in the generator/absorber unit 100 during the day. This partial pressurization of the aqua-ammonia solution in the generator/absorber unit 100 occurs by opening valves 130 and 132 while keeping valves 134 and 136 closed, thereby connecting the solar collector unit 102 to the generator heat exchanger 104 via conduit paths 151, 153 to heat the aqua ammonia solution while preventing the absorber heat exchanger 106 from cooling the solution.

The pressurization process is persistent, as heat is gained from the solar collector 102 through the heat exchange coil 104. The result of the pressurization process is that the temperature of the aqua-ammonia solution in the generator/absorber unit 100 rises. The generation process at a constant pressure in the heat exchange coil 104 of the generator/absorber unit 100 starts, and the temperature of the solution continues to increase. As a result from the generation process and the heat gained through the solar collector unit 102, aqua-ammonia vapor is formed in the generator/absorber unit 100, and the concentration of the strong aqua-ammonia solution decreases, which causes a further escalation in the temperature of the solution. As the generation continues, the water content in the aqua-ammonia vapor also increases concurrently with the temperature inside in the generation/absorber unit 100.

To continue the process of producing a cooling effect in the intermittent system 10 during the daytime, the water content in the aqua-ammonia vapor must be removed by the dephlegmator unit 108. The dephlegmator unit 108 is located above the generator/absorber unit 100 and houses at least one heat exchanger 110 for cooling purposes. The aqua-ammonia solution is rises 155 to the dephlegmator unit 108, which operates as a reflux condenser. The water content is removed by the dephlegmator unit 108 and returned to the generator/absorber unit 100. As a part of its function, the dephlegmator unit 108 is automated to rectify the aqua-ammonia vapor for operation at evaporating temperatures below the freezing point of water. The mixture of aqua-ammonia vapor generated by the generator/absorber unit 100 is cooled above the condenser temperature by the heat exchanger 110 in the dephlegmator unit 108. The cooling of the aqua-ammonia vapor results in the rectification of aqua-ammonia vapor, as all the water vapor is condensed inside the dephlegmator unit 108 and directed via conduit path 157 back to the generator/absorber unit 100, and the rectified pure ammonia vapor is passed via conduit and open valve 138 to the ejector 112.

The ejector 112 allows the addition of a refrigeration feedback loop in the circuit for operation during the daytime, in addition to the system's usual nighttime operation. As the rectified ammonia vapor is passed through the ejector 112, the flow of ammonia vapor is accelerated through the ejector's nozzle and a reduction in pressure occurs. This reduction in pressure allows the rectified ammonia vapor to mix with any saturated ammonia vapor inside the mixing chamber of the ejector 112 before entering the diffuser section of the ejector 112. Once the rectified vapor enters the diffuser section of the ejector 112, the vapor flow decelerates and pressure recovery starts. The ammonia vapor then leaves the diffuser section of the ejector 112 and is directed via conduit path 159 to the condenser unit 114 for condensation.

The process continues by isolating the generator/absorber unit 100 from the ejector 112, the condenser unit 114, and the evaporator units 122 and 118 by closing of valves 138 and 150. This process allows the generator/absorber unit 100 to act as a generator as heat is added to the intermittent system through the heat exchanger 104. The rectified or purified ammonia vapor is condensed by rejecting the heat to the heat exchanger 116 in the condenser unit 114 to form pure liquid ammonia, which is then passed through valve 140 and stored as a saturated liquid inside of the first evaporator unit 122 during the daytime.

The stored ammonia liquid refrigerant is partly utilized within the feedback refrigeration loop of the ejector 112 for providing a refrigeration or cooling effect during the daytime, and the remaining liquid ammonia is stored to be utilized for producing a refrigeration or cooling effect during the nighttime. At this point in the process, ball valve 142 and throttling valve 144 are open, and the ball valve 148 and throttling valve 150 are closed, permitting a portion of the liquid ammonia to flow to the second evaporator unit 118 instead of to the generator/absorber unit 100. The process continues with the part of the stored liquid refrigerant inside the first evaporator unit 122 undergoing the throttling process and entering into the second evaporator 118 unit, where it produces the refrigeration effect in the heat exchanger 120 for use during the daytime.

After producing the required refrigeration effect, the throttled ammonia refrigerant becomes saturated ammonia vapor by heat exchange with heat exchanger 120, and passes through valve 146 and conduit path 165, and is inducted into the ejector 112 to be mixed with the rectified ammonia vapor generated by the generator/absorber unit 100. After the induction of saturated ammonia from the second evaporator unit 118 and its receipt by the ejector 112, this mixture is returned back into the condenser unit 114 for condensation, passing through valve 140 to be stored in the first evaporator unit 122, thereby completing the refrigeration loop during the daytime.

At the beginning of the daytime, the generator/absorber unit 100 is filled with cold, strong aqua-ammonia solution and the first evaporator unit 122 is empty. As a result of the daytime operations of the system 10, the generator/absorber unit 100 will then be filled with hot, weak aqua-ammonia solution and the first evaporator unit 122 will be filled with the liquid ammonia refrigerant. At the beginning of the nighttime, the generation process is followed by the depressurization of the weak aqua-ammonia solution in the generator/absorber unit 100. The depressurization of the weak aqua-ammonia solution in the generator/absorber unit 100 occurs by isolating the solar collector 102 from the generator/absorber unit 100. The solar collector 102 is isolated from the generator/absorber unit 100 from the system 10 by closing valves 130 and 132. The heat exchanger 106 is connected to the generator/absorber unit 100 by opening the valves 134 and 136 to cool the solution in the generator/absorber unit 100 by removing heat.

At this point, the generator/absorber unit 100 is operating during the nighttime as an absorber for the system 10. The depressurization continues as the heat exchanger 106 rejects the heat of the solution in the generator/absorber unit 100. During the depressurization process, the saturated liquid refrigerant is kept isolated from the system by keeping the ball value 138 and throttling valve 150 closed. The ball valve 138 and the throttling valve 150 are closed in order keep the generator/absorber unit 100 isolated from the absorption process.

Once the depressurization is completed, the ball valve 148 and the throttling valve 150 are opened, which reduces the pressure inside of the first evaporator unit 122. This produces a refrigeration effect in the heat exchanger 124 of the first evaporator unit 122 due to the evaporation of the refrigerant. The heat exchanger 124 inside of the first evaporator unit 122 may be filled with a brine solution to avoid the heat exchanger 124 becoming inoperative as a result of the heat exchanger 124 dropping to a temperature below the freezing point of water. The refrigerant (ammonia) vapor is then moved from the evaporator unit 124 through the throttling valve 150 and directed 167 to the generator/absorber unit 100 for absorption into the weak aqua-ammonia solution inside the generator/absorber unit 100.

At this point, a strong solution is produced inside the generator/absorber unit 100 as a result of the absorption of the liquid ammonia refrigerant by water in the weak aqua-ammonia solution, accompanied by the transfer of heat from the absorption process to the heat exchanger 106. A coolant is provided to the condenser unit 114 and the dephlegmator unit 108 during the daytime, and to the heat exchanger 106 during the nighttime.

The intermittent system's overall coefficient of performance is generally the ratio of the total energy of evaporation, i.e., the refrigeration effect, to the total energy of generation. The addition of the ejector 112 is the system contributes to the generation process by adding a refrigeration loop to the system 10. The addition of the refrigeration loop to the intermittent system 10 produces a refrigeration or cooling affect during the daytime, which normally occurs in a continuous system, but does not usually occur during the daytime in an intermittent system. The addition of the ejector 112 and the second evaporator 118 to the intermittent absorption system contributes and directly results in the increase of the overall refrigeration effect of the intermittent absorption refrigeration system in one cycle. The addition of the ejector 112 feedback refrigeration loop to the system also increases the coefficient of performance of the system. This increase in the coefficient of performance reduces the energy required from the solar collector unit 102.

The present system 10 may include a conventional control system to control the timing of opening and closing the various valves, which may be solenoid valves or servo motor-controlled valves, in the system 10. The control system may include a processor (such as a programmable logic controller), a timer circuit, and various sensors, including photodetectors, temperature sensors, pressure sensors, etc., as is known in the art.

It is to be understood that the present invention is not limited to the embodiments described above, but encompasses any and all embodiments within the scope of the following claims.

We claim:

1. An intermittent absorption refrigeration system with an ejector, comprising:
   a primary refrigerant loop having:
      a combination generator/absorber unit having a generator heat exchanger and an absorber heat exchanger;
      a dephlegmator connected to the combination generator/absorber unit;
      the ejector selectively connected to the dephlegmator;
      a condenser unit connected to a diffuser;
      a first evaporator unit selectively connected to the condenser and selectively connected to the combination generator/absorber unit;
      a solar collector unit selectively connected to the generator heat exchanger of the combination generator/absorber unit; and
   aqua-ammonia coolant circulating between the combination generator/absorber unit, the dephlegmator, the condenser unit, and the first evaporator unit so that the combination generator/absorber unit, the dephlegmator, the condenser unit, the first evaporator unit, the solar collector unit and the aqua-ammonia coolant define a solar-powered intermittent absorption system operable to generate liquid ammonia refrigerant for storage in the first evaporator unit in daytime and to produce a refrigerant effect in the first evaporator unit and absorb the refrigerant in the combination generator/absorber unit at nighttime; and
   a refrigerant feedback loop having:
      a second evaporator unit;
      a first conduit disposed between the first evaporator unit and the second evaporator unit;
      a ball valve and a throttling valve disposed in series in the first conduit between the evaporator units, the ball valve and the throttling valve being selectively openable in the daytime to produce a refrigerant effect in the second evaporator unit;
      a second conduit disposed between the second evaporator and the ejector; and
      a feedback valve disposed in the second conduit, the feedback valve being selectively openable in the daytime to feed the liquid ammonia refrigerant back to the ejector for flow to the condenser and the first evaporator unit;
   whereby the intermittent absorption refrigeration system is operable to produce a refrigerant effect during both the daytime and the nighttime.

2. The intermittent absorption refrigeration system with an ejector of claim 1, wherein the dephlegmator unit is located above the generator/absorber unit.

3. A method of producing refrigerant effects in an intermittent absorption refrigeration system during both daytime and nighttime, comprising the steps of:
   during the daytime, pressurizing a combination generator/absorber unit while blocking flow of coolant through an absorber heat exchanger in the combination generator/absorber unit in order to heat a cold, strong aqua-ammonia solution in the combination generator/absorber unit, generating aqua-ammonia vapor;
   rectifying the aqua-ammonia vapor in a dephlegmator to produce pure ammonia vapor, water being condensed from the aqua ammonia vapor and returned to the combination generator/absorber unit;
   flowing the pure ammonia vapor through an ejector and into a condenser unit;
   condensing the ammonia vapor to form liquid ammonia;
   storing the liquid ammonia in a first evaporator unit during the daytime;
   drawing a portion of the liquid ammonia from the first evaporator unit into a second evaporator unit;

producing a refrigeration effect drawn off by a heat exchanger in the second evaporator unit during the daytime, thereby forming saturated ammonia vapor in the second evaporator unit;

inducting the saturated ammonia vapor from the second evaporator unit into the ejector;

mixing the saturated ammonia vapor from the second evaporator unit with the pure ammonia vapor from the dephlegmator in the ejector, whereby a portion of the liquid ammonia is continuously cycled through a feedback loop comprising the ejector, the condenser unit, the first evaporator unit and the second evaporator unit to produce refrigerant effects during the daytime;

at nighttime, depressurizing the combination generator/absorber unit while isolating the feedback loop from the combination generator/absorber unit and the dephlegmator;

after depressurizing the combination generator/absorber unit, opening a ball valve and a throttling valve between the first evaporator unit and the combination generator/absorber unit, thereby reducing pressure and producing a refrigerant effect in the first evaporator unit during the nighttime by evaporation of the stored liquid ammonia, producing ammonia vapor;

throttling the ammonia vapor through the throttling valve into the combination generator/absorber unit; and absorbing the ammonia vapor in the aqua-ammonia solution in the combination generator/absorber unit during the nighttime.

4. The method of producing refrigerant effects according to claim 3, wherein said step of pressurizing the combination generator/absorber unit comprises the steps of:

opening valves in conduits connecting a solar collection unit to a generator heat exchanger in the combination generator/absorber unit to apply heat to the aqua-ammonia solution; and closing valves connecting a coolant to the absorber heat exchanger in the combination generator/absorber unit to prevent cooling the aqua-ammonia solution during pressurization.

5. The method of producing refrigerant effects according to claim 4, wherein said step of pressurizing the combination generator/absorber unit comprises the steps of:

closing the valves in the conduits connecting the solar collection unit to the generator heat exchanger in the combination generator/absorber unit;

opening the valves connecting the coolant to the absorber heat exchanger in the combination generator/absorber unit to cool the aqua-ammonia solution during depressurization; and keeping the ball valve and the throttling valve between the first evaporator unit and the combination generator/absorber unit closed during depressurization of the combination generator/absorber unit.

* * * * *